(12) United States Patent
Veine et al.

(10) Patent No.: US 7,537,282 B2
(45) Date of Patent: May 26, 2009

(54) HEAD RESTRAINT ARRANGEMENT FOR A VEHICLE SEAT AND A METHOD OF MANUFACTURE

(75) Inventors: Eric Veine, Madison Heights, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 422 days.

(21) Appl. No.: 11/161,466

(22) Filed: Aug. 4, 2005

(65) Prior Publication Data

US 2005/0253429 A1 Nov. 17, 2005

Related U.S. Application Data

(63) Continuation-in-part of application No. 10/736,717, filed on Dec. 16, 2003, now abandoned.

(51) Int. Cl.
    *B60N 2/42* (2006.01)
(52) U.S. Cl. ................. 297/216.12; 297/391
(58) Field of Classification Search ........... 297/391, 297/216.12, 216.13, 216.14
    See application file for complete search history.

(56) References Cited

U.S. PATENT DOCUMENTS

| | | | |
|---|---|---|---|
| 3,205,005 A | 9/1965 | Brown | |
| 3,650,561 A | 3/1972 | Faust et al. | |
| 4,738,809 A | 4/1988 | Storch | |
| 4,844,544 A | 7/1989 | Ochiai | |
| 5,257,853 A | 11/1993 | Elton et al. | |
| 5,328,244 A | 7/1994 | Ishihara et al. | |
| 5,468,433 A | 11/1995 | Perry et al. | |
| 5,820,211 A | 10/1998 | Heilig et al. | |
| 5,855,831 A | 1/1999 | Takei | |
| 5,961,182 A * | 10/1999 | Dellanno | 297/216.12 X |
| 5,984,414 A | 11/1999 | Adachi et al. | |
| 6,056,358 A | 5/2000 | De Filippo | |
| 6,120,100 A | 9/2000 | Palazzolo et al. | |
| 6,183,045 B1 | 2/2001 | Marfilius et al. | |
| 6,200,506 B1 | 3/2001 | Takei | |
| 6,213,548 B1 * | 4/2001 | Van Wynsberghe et al. | 297/216.12 |
| 6,224,158 B1 | 5/2001 | Hann | |
| 6,412,872 B2 | 7/2002 | Takeda et al. | |
| 6,419,322 B2 | 7/2002 | Nakane et al. | |
| 6,499,805 B1 | 12/2002 | Watadani | |
| 6,527,344 B2 | 3/2003 | Takei | |
| 6,585,318 B1 | 7/2003 | Tak | |
| 7,066,544 B2 * | 6/2006 | Tseng | 297/391 |
| 2002/0053819 A1 | 5/2002 | Itoh | |

FOREIGN PATENT DOCUMENTS

JP 09313293 A * 12/1997

* cited by examiner

*Primary Examiner*—Anthony D Barfield
(74) *Attorney, Agent, or Firm*—Brooks Kushman P.C.

(57) ABSTRACT

A head restraint arrangement for a vehicle seat and a method of manufacture. The head restraint arrangement comprises a support member, a cushion disposed around the support member, and an insert panel disposed in the cushion. The insert panel moves toward the support member in response to force exerted by a head of a seat occupant to distribute force and reduce deformation of the cushion.

14 Claims, 2 Drawing Sheets

HEAD RESTRAINT ARRANGEMENT FOR A VEHICLE SEAT AND A METHOD OF MANUFACTURE

CROSS-REFERENCE TO RELATED APPLICATIONS

This application is a continuation-in-part of U.S. application Ser. No. 10/736,717, filed Dec. 16, 2003 now abandoned.

BACKGROUND OF THE INVENTION

1. Field of the Invention

The present invention relates to a head restraint arrangement for a vehicle seat and a method of manufacture.

2. Background Art

A headrest having an impact barricade and an oil-pressure damper is disclosed in U.S. Pat. No. 6,585,318.

SUMMARY OF THE INVENTION

In at least one embodiment of the present invention, a head restraint arrangement for a vehicle seat is provided. The head restraint arrangement comprises a support member, a cushion, and an insert panel. The cushion is disposed around at least a portion of the support member and has front, rear, and top surfaces. The insert panel is disposed in the cushion and includes first and second portions. The first portion has an end section disposed near the top surface. The second portion is disposed adjacent to the end section and extends toward the rear surface. The insert panel moves toward the support member in response to force exerted by a head of a seat occupant to distribute force and reduce deformation of the cushion.

In at least one other embodiment of the present invention, a vehicle seat for use with a vehicle is provided. The vehicle seat comprises a seat back, a support member attached to the seat back, a cushion, a trim cover, and a generally L-shaped insert panel. The cushion is formed around the support member and has an outer surface. The trim cover is disposed proximate the outer surface. The generally L-shaped insert panel is disposed in the cushion and is spaced apart from the support member. The insert panel includes a first portion disposed between the trim cover and the support member and a second portion integrally formed with the first portion and extending over an upper surface of the support member. The generally L-shaped insert panel is adapted to move between an initial position and an actuated position such that the insert panel is moved toward the support member upon application of force by a head of a seat occupant.

In at least one other embodiment of the present invention, a method of making a head restraint arrangement for a vehicle seat is provided. The head restraint arrangement includes an insert panel, a support member, and a cushion. The method comprises positioning the insert panel and the support member in a cavity such that the insert panel is spaced apart from the support member, and providing a foam material that encapsulates the insert panel and at least a portion of the support member to define the cushion. The foam material permits movement of the insert panel relative to the support member.

DETAILED DESCRIPTION

Figure 1:
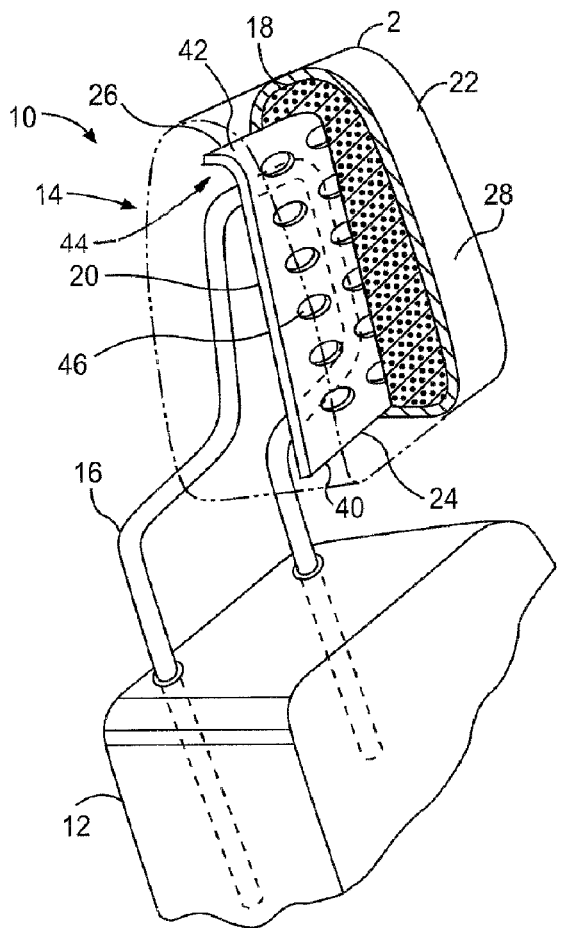
FIG. 1 is a fragmentary perspective view of a vehicle seat that includes a head restraint arrangement having an insert panel.

Referring to FIG. 1, an exemplary embodiment of a vehicle seat 10 is shown. The vehicle seat 10 includes a seat back 12 and a head restraint arrangement 14. The head restraint arrangement 14 may include at least a portion of a support member 16, a cushion 18, an insert panel 20, and a trim cover 22.

The support member 16 may couple the head restraint arrangement 14 to the seat back 12. The support member 16 may have any suitable configuration. In the embodiment shown, the support member 16 has a generally U-shaped configuration. In addition, the support member 16 may accommodate positioning of the head restraint arrangement 14 with respect to the seat back 12.

Figure 2:
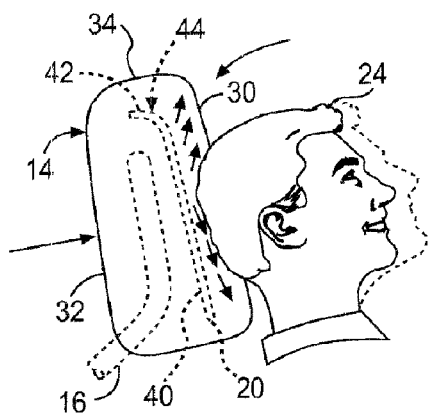
FIG. 2 is a side view of the head restraint arrangement of FIG. 1 depicting a head of a seat occupant exerting force upon the head restraint arrangement.
Figure 3:
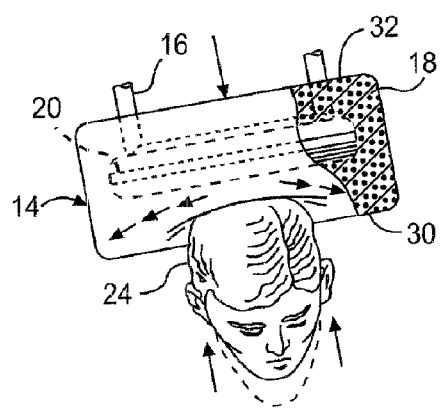
FIG. 3 is a top view of the head restraint arrangement shown in FIG. 2.

The cushion 18 may be disposed around at least a portion of the support member 16. Moreover, the cushion 18 may receive and/or distribute force exerted by a head 24 of a seat occupant as is best shown in FIGS. 2 and 3. The cushion 18 may have any suitable configuration and may be made of any suitable material, such as a polymeric foam. In addition, the cushion 18 may include a front surface 30, a rear surface 32 disposed opposite the front surface 30, and a top surface 34 that extends between the front and rear surfaces 30,32.

The insert panel 20 may be disposed in the cushion 18 and may help distribute force exerted by the head 24 of the seat occupant to reduce deformation of the cushion 18 and/or trim cover 22 and to help improve seating comfort. The insert panel 20 may have any suitable configuration. In at least one embodiment, the insert panel 20 may include a first portion 40 and a second portion 42 disposed proximate the first portion 40. In addition, the insert panel 20 may be made of any suitable material, such as a polymeric material, metal, or combinations thereof.

The first portion 40 may help distribute force exerted by the head 24 of the seat occupant upon the front surface 30. The first portion 40 may have any suitable configuration. For example, the first portion 40 may be generally planar or non-planar and may extend generally parallel to the front surface 30. The first portion 40 may include an end section 44 disposed near and spaced apart from the top surface 34. Optionally, the first portion 40 may include a plurality of apertures 46 that may receive a portion of the cushion 18 to help secure the insert panel 20 in a desired location and help reduce weight.

The second portion 42 may have any suitable configuration. For example, the second portion 42 may extend from the first portion 40. In at least one embodiment, the second portion 42 may extend from the end section 44 and toward the rear surface 32. In addition, the second portion 42 may extend generally parallel to the top surface 34. As such, the first and second portions 40,42 may cooperate to define an insert panel 20 having a generally L-shaped arrangement. The second portion 42 may be disposed above at least a portion of the support member 16 to help distribute force exerted by the head 24 of the seat occupant upon the front and/or top surfaces 30,34. In addition, the second portion 42 may be integrally formed with the first portion 40.

The first and second portions 40,42 may each have surface areas that are greater than a majority (i.e, greater than 50%) of the surface areas of the front and top surfaces 30,34, respectively. As such, the insert panel 20 may help separate the head 24 of a seat occupant from the support member 16 from various angles.

Figure 4:
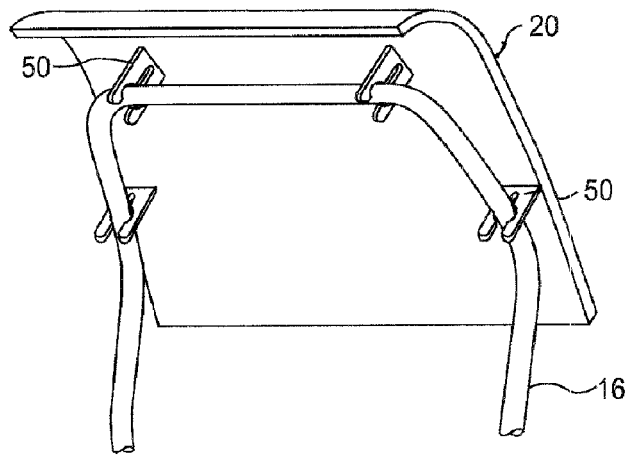
FIG. 4 is a rear perspective view of an embodiment of the insert panel having attachment features.

The insert panel 20 may be spaced apart from the support member 16 such that the insert panel "floats" inside the cushion 18. Alternatively, the insert panel 20 may include one or more attachment features 50 as shown in FIG. 4. The attachment features 50 may have any suitable configuration. For example, the attachment features 50 may be configured as clips that extend through the cushion 18 for attaching the insert panel 20 to the support member 16. The attachment features 50 may be configured to break or otherwise disengage to permit the insert panel 20 to move relative to the support member 16 when sufficient force is applied to the head restraint arrangement 14.

The trim cover 22 may be disposed around at least a portion of the cushion 18. The trim cover 22 may have any suitable configuration and may be made of any suitable material, such as a polymeric material, fabric, or leather.

Figure 5:
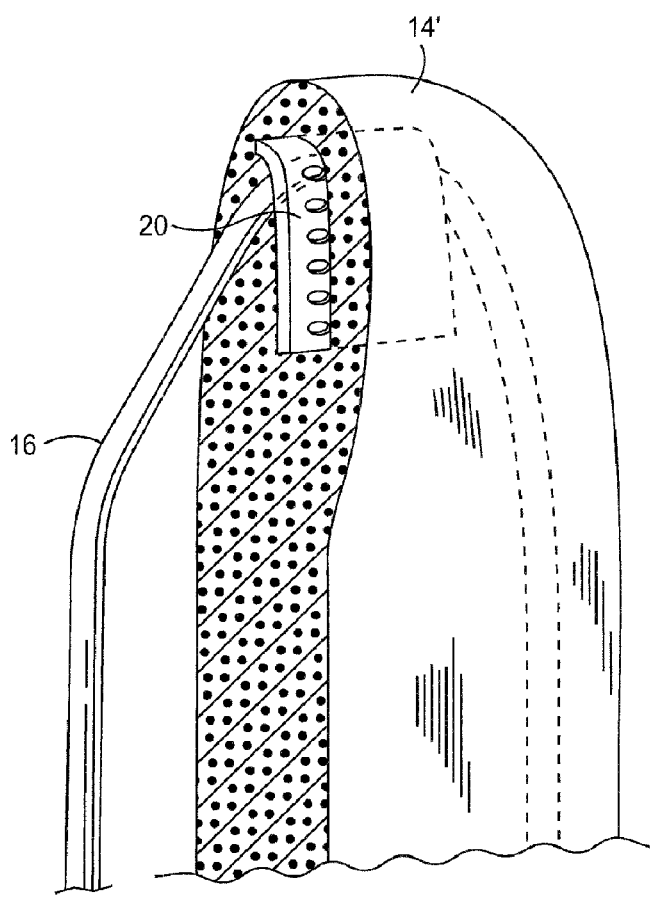
FIG. 5 is a fragmentary perspective view of an embodiment of a vehicle seat having an integrally formed head restraint arrangement.

Referring to FIG. 5, another embodiment of a head restraint arrangement is shown. In this embodiment, the head restraint arrangement 14 is integral with and not adjustable relative to the vehicle seat. Moreover, the insert panel 20 may be located near the top of the vehicle seat to provide support similar to that associated with a moveable head restraint arrangement.

Figure 6:
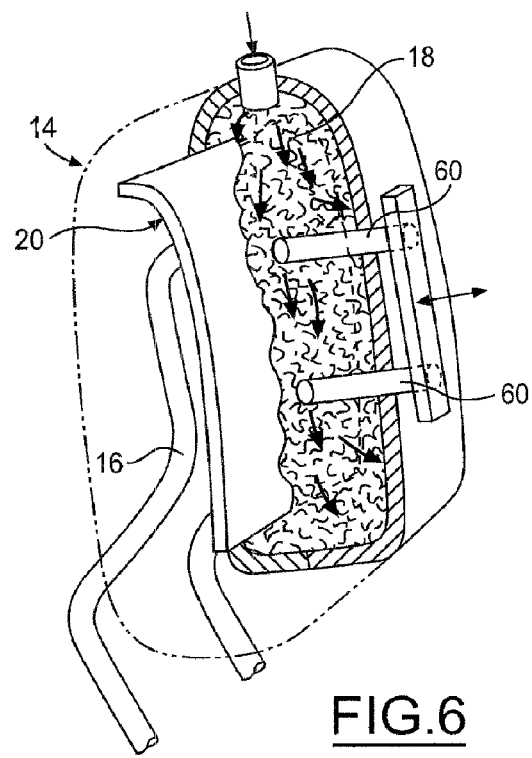
FIG. 6 is a fragmentary perspective view of the head restraint arrangement showing locating pins for positioning the insert panel during manufacture.

Referring to FIG. 6, an exemplary embodiment of a portion of a method of manufacturing a head restraint arrangement is shown. First, the insert panel 20 and the support member 16 may be positioned in a cavity. The cavity may be defined by a mold and/or the trim cover 22. In an embodiment without attachment features, the insert panel 20 may be spaced apart from the support member 16. Positioning of the insert panel 20 relative to the support member 16 may be accomplished using one or more locating pins 60. The locating pins 60 may extend through the trim cover 22 and may be fixedly positioned to hold the insert panel 20 in a desired location. For example, the locating pins 60 may extend through one or more openings in a trim cover surface in a predetermined location to provide a desirable aesthetic appearance. Next, the cushion 18 may be provided in any suitable manner. For example, a foam material may be inserted or injected to encapsulate the insert panel 20 and at least a portion of the support member 16. Subsequently, the locating pins 60 may be removed.

The present invention may help prevent an occupant's head from penetrating too deeply into the cushion where it may experience undesirable load forces. As such, one or more embodiments of the present invention may help provide more uniform loading and reduce acceleration forces and head rotation to help protect the head and/or neck of a seat occupant during a vehicle impact event. Moreover, one or more embodiments of the present invention may increase head restraint stiffness and/or improve load distribution while maintaining comfort and compatibility with various seat and support member designs. In addition, one or more embodiments of the present invention may help reduce cushion recovery time to comply with government, industry, and/or manufacturer requirements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head restraint arrangement for a vehicle seat, the head restraint arrangement comprising:
    a support member associated with the vehicle seat;
    a cushion disposed around at least a portion of the support member, the cushion having a front surface, a rear surface disposed opposite the front surface, and a top surface extending between the front and rear surfaces; and
    an insert panel disposed in the cushion wherein the insert panel is encapsulated by the cushion such that all surfaces of the insert panel are in direct contact with the cushion, the insert panel comprising a first portion having an end section disposed near the top surface, and a second portion disposed adjacent to the end section and extending toward the rear surface;
    wherein the insert panel moves toward the support member in response to force exerted by a head of a seat occupant to distribute force and reduce deformation of the cushion.

2. The head restraint arrangement of claim 1 wherein the first and second portions distribute force exerted against the front and top surfaces, respectively, to reduce deformation of the cushion.

3. The head restraint arrangement of claim 1 wherein the insert panel is spaced apart from the support member.

4. The head restraint arrangement of claim 1 wherein the insert panel further comprises an attachment feature coupled to the support member such that the attachment feature breaks when sufficient force is exerted by the head of the seat occupant.

5. The head restraint arrangement of claim 1 wherein the second portion extends generally parallel to the top surface.

6. The head restraint arrangement of the claim 1 wherein at least part of the second portion is disposed over the support member.

7. The head restraint arrangement of claim 1 wherein the first portion has a first surface area and the front surface has a front surface area, wherein the first surface area is greater than a majority of the front surface area.

8. The head restraint arrangement of claim 1 wherein the second portion has a second surface area and the top surface has a top surface area, wherein the second surface area is greater than a majority of the top surface area.

9. The head restraint arrangement of claim 1 wherein the head restraint arrangement is integral with and not adjustable relative to the vehicle seat.

10. A vehicle seat for use with a vehicle, the vehicle seat comprising:
    a seat back;
    a support member attached to the seat back;
    a cushion in direct contact with support member, the cushion having an outer surface;
    a trim cover disposed proximate the outer surface, the trim cover defining a front surface configured to support the head of a seat occupant; and
    a generally L-shaped insert panel disposed in the cushion and spaced apart from the support member, the insert panel including a first portion disposed between the front surface of the trim cover and the support member and a second portion integrally formed with the first portion and extending over an upper surface of the support member;

wherein the generally L-shaped insert panel is adapted to move between an initial position and an actuated position such that the insert panel is moved toward the support member upon application of force by a head of a seat occupant.

11. The vehicle seat of claim 10 wherein the insert panel reduces penetration of the head into the cushion.

12. The vehicle seat of claim 10 wherein the head restraint arrangement includes first and second exterior sides and the first and second portions extend further toward the first and second sides than the support member.

13. The head restraint arrangement of claim 10 wherein the insert panel further comprises a plurality of apertures filled with foam.

14. The head restraint arrangement of claim 10 wherein the first and second portions distribute force exerted against the front and top surfaces, respectively, to reduce deformation of the cushion.

* * * * *

UNITED STATES PATENT AND TRADEMARK OFFICE
CERTIFICATE OF CORRECTION

PATENT NO.        : 7,537,282 B2                                              Page 1 of 1
APPLICATION NO.   : 11/161466
DATED             : May 26, 2009
INVENTOR(S)       : Eric Viene et al.

It is certified that error appears in the above-identified patent and that said Letters Patent is hereby corrected as shown below:

Column 4, Line 59, Claim 10:

After "with" insert -- the --.

Signed and Sealed this

Twenty-first Day of July, 2009

JOHN DOLL
*Acting Director of the United States Patent and Trademark Office*